United States Patent Office 2,954,160
Patented Sept. 27, 1960

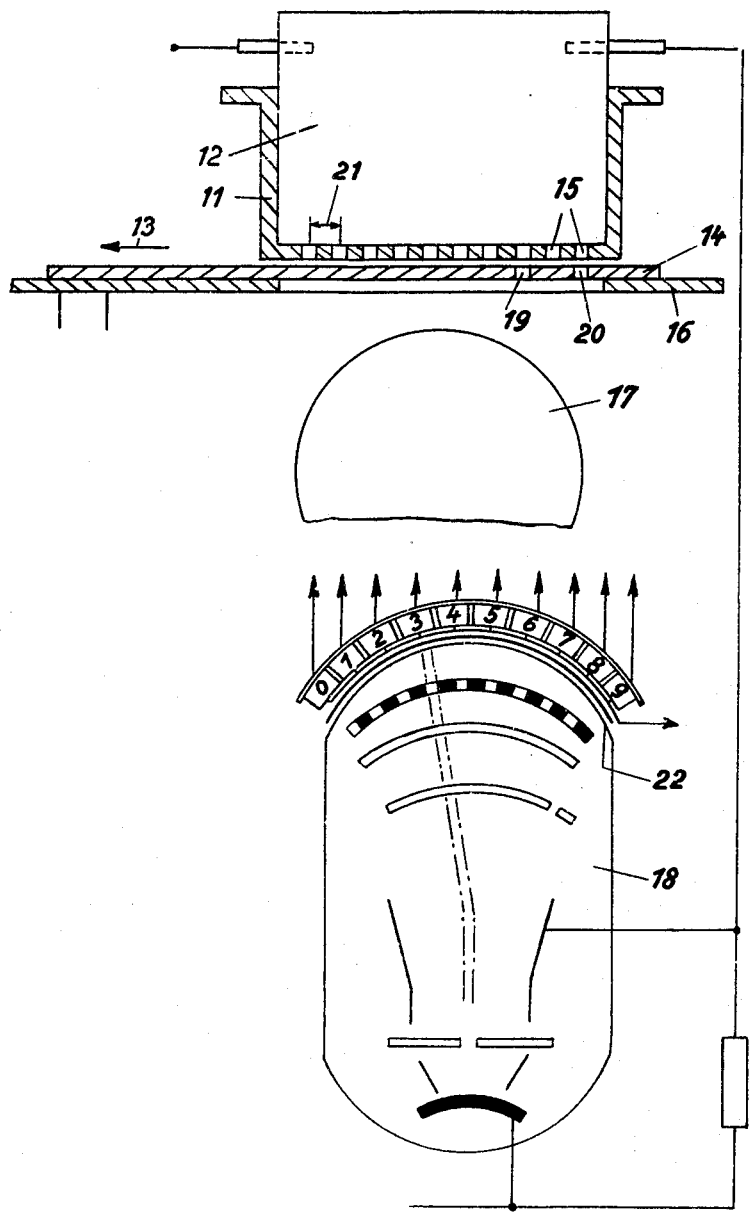

2,954,160

APPARATUS FOR SCANNING PERFORATED VOUCHERS

Erwin Spingies, Hamburg, and Herbert Rose, Wohltorf, Lauenburg, Germany, assignors to Brunsviga Maschinenwerke Aktiengesellschaft, Braunschweig, Germany Filed May 24, 1957, Ser. No. 661,380

Claims priority, application Germany July 19, 1956

4 Claims. (Cl. 235—61.11)

The known apparatus for scanning perforated vouchers have wiper brushes at each characteristic or value place. In these apparatus the wiper brushes make direct contact with a counter-plate through the holes in the voucher, whereby the scanned value is determined by the distance of the contact point from the edge of the voucher. These apparatus are open to the objection that a synchronous running of the voucher feed and the value finding arrangement is necessary.

Scanning apparatus are also known which have only one feeler per place and do not require synchronous running for determining the values. In these apparatus the value is represented by a plurality of perforations in the voucher. Owing to the large number of holes per value the strength of the voucher is weakened on the one hand and on the other hand a large space is necessary for representing a value.

Scanning devices are also known which carry out the scanning photo-electrically. An electromechanically operating recorder is necessary for indicating the values so that the run-through speed of the vouchers is limited.

The object of the invention is to provide an apparatus for scanning perforated vouchers in which the known disadvantages are avoided and the values can be picked up at a high speed and electronically calculated.

According to the invention, an apparatus for scanning perforated vouchers with perforation markings arranged side by side, comprises separate scanners arranged side by side for said perforation markings, housings, one for each of said scanners, provided with apertures arranged one behind the other in the direction of travel of the vouchers at uniform distances apart, a photo-electric constructional element in each of said housings, a decade counting mechanism connected to said photo-electric constructional element, and means 0 to 9 associated to said decade counting mechanism for picking up the counting results for the purpose of recording and controlling.

It is preferable to arrange each housing between the photo-electric constructional element which may be a light-sensitive cell, a photo-electric resistance, a photo-cell or a phototransistor, and the vouchers passing through the apparatus.

For representing figures ten apertures are arranged in the housing. For representing letters two parallel rows of ten apertures may be provided, the photo-electric constructional element, in this instance, being subdivided. The decade counting device may be connected up with the photo-electric constructional element via an amplifier and can transmit the counted values to a recording mechanism or to other devices for controlling operations. The decade counting device is so constructed that it is only zeroized after the value has been transmitted.

A preferred embodiment of a scanning apparatus according to the invention is illustrated diagrammatically by way of example in the only figure of the accompanying drawing.

A light-sensitive cell 12 of a single scanner is arranged in a housing 11. This housing 11 has on the side facing the vouchers a succession of apertures 15 located in the direction 13 in which the vouchers 14 travel. The vouchers are carried along on a voucher carrier 16. A source of light 17 is located under the voucher carrier 16. A decade counting device 18 is electrically connected up with the light-sensitive cell 12. The impulses produced by the scanner can be picked up according to value by the decade counting device 18 through the intermediary of light-sensitive cells 0 to 9.

In the voucher two holes 19 and 20 are provided for each of the numbers 1 to 9 at different distances apart.

The spacings of the holes 19 and 20 for each numerical value are dependent upon the corresponding uniform spacing of the apertures 15 in the housing 11.

If the voucher is perforated for the value 1 it has two holes spaced at a distance apart equal to a unit 21 as shown in the drawing. If the value 2 is represented the distance between the two holes is equal to two units 21.

When the voucher 14 in passing through the apparatus comes under the scanning device it is radiated by the source of light 17. The rays pass through the apertures 19 and 20 provided in the voucher 14 and impinge upon the light-sensitive cell 12 through the apertures 15 in the housing 11.

Twelve impulses are transmitted by the two holes 19 and 20 through the ten apertures 15 in the housing 11 and thence to the decade counting device 18. This remains stationary on 2 because, after twelve impulses without tens-transfer, the value 2 is produced. In the case of other numbers which have a distance between their holes equal to several units 21, the same operation takes place with a corresponding number of impulses as the voucher runs through the apparatus.

For representing zero the perforations in the voucher 14 can be omitted or only one hole be provided. If the voucher has only one hole ten light impulses will pass through the ten apertures 15 in the housing 11 onto the light-sensitive cell 12 which transmits ten electric impulses on to the decade counting device 18. After ten impulses this is once more in its zero position so that the value zero can be picked up by the counting mechanism.

The decade counting mechanism has a luminous screen 22 with light-sensitive cells 0 to 9 and these are utilized for picking up values and controlling instruments connected up in series.

From the above detailed description of the invention, it is believed that the construction will at once be apparent, and while there is herein shown and described a preferred embodiment of the invention, it is nevertheless to be understood that minor changes may be made therein without departing from the spirit and scope of the invention as claimed.

We claim:

1. Apparatus for sensing the perforations in a perforated information-bearing member in which the spacing between two perforations represents information, said apparatus comprising a housing, one side of said housing being adapted to be adjacent a perforated information-bearing member being sensed, said member having two perforations separated by a distance equal to the number of unit distances being represented, said side having a plurality of equally spaced openings the number of which openings equals the radix of the system in which information is represented on said member and the spacing of which openings is equal to said unit distance, an energy-sensitive element within said housing adjacent said openings, means without said housing opposite the side having said openings for irradiating said side with radiant energy, means for moving a perforated information-bearing member between said side and said irradiating means whereby radiant energy is allowed to impinge upon the energy sensitive element only when an information perforation in said member passes an opening in the side of said housing, and means responsive to the pulse output of said light-sensitive element for indicating the number of unit distances between adjacent information perforations in said member.

2. Apparatus for sensing perforations in a perforated information-bearing member in which the spacing between perforations represents information, said apparatus comprising a housing having at least one side, said side having a plurality of equally spaced openings arranged in rows, said openings being separated by a unit distance, each row containing a number of openings equal to the radix of the system in which information is represented, a radiant energy sensitive element contained within said housing with its sensitive surface positioned to receive energy passing through said openings, a source of radiant energy without said housing adapted to irradiate said side, means for moving a perforated information-bearing member having at least one row of perforation past said side such that each row of perforations in said member moves past a row of openings in said side to allow radiant energy from said source to penetrate and impinge upon the energy sensitive element within said housing, each row in said member comprising two perforations and representing information by the number of unit distances separating said two perforations, and counting means connected to the output of said energy sensitive element counting in the radix of the information system for indicating the spacing between perforations in the same rows in said member counting the output pulses from said element.

3. The apparatus defined in claim 2 wherein said counting means comprises a device which automatically returns to zero after counting through the number representing the radix of the information system.

4. The apparatus defined in claim 2 wherein said source of radiant energy is a source of light and wherein said sensitive elements are photocells.

References Cited in the file of this patent

UNITED STATES PATENTS

| | | |
|---|---|---|
| 2,319,108 | Broido | May 11, 1943 |
| 2,600,817 | Victoreen | June 17, 1952 |
| 2,621,313 | Steinberg | Dec. 9, 1952 |
| 2,762,931 | Schewe | Sept. 11, 1956 |